J. H. MORGAN.
BLOWER.
APPLICATION FILED SEPT. 11, 1920.
1,416,229.
Patented May 16, 1922.
2 SHEETS—SHEET 2.
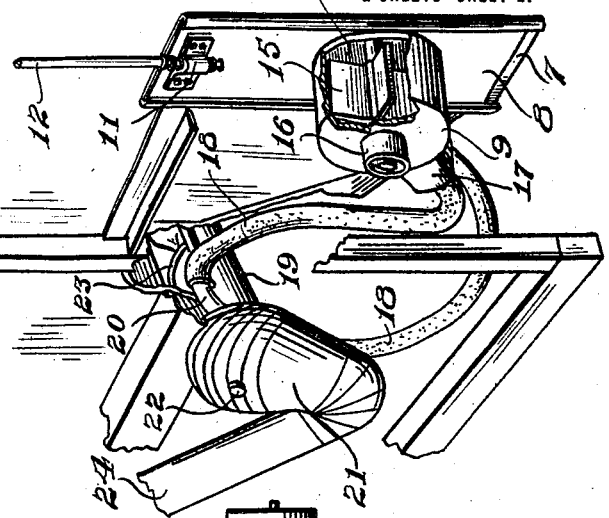
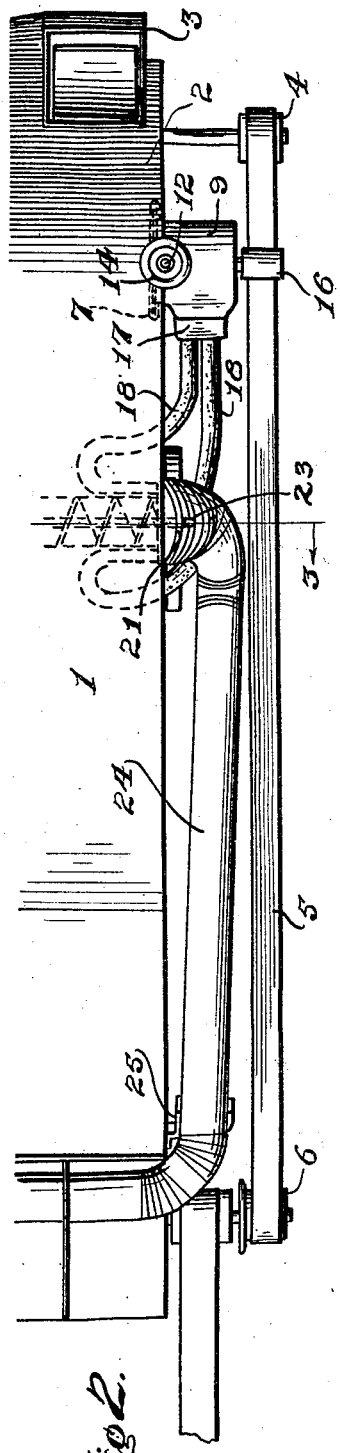
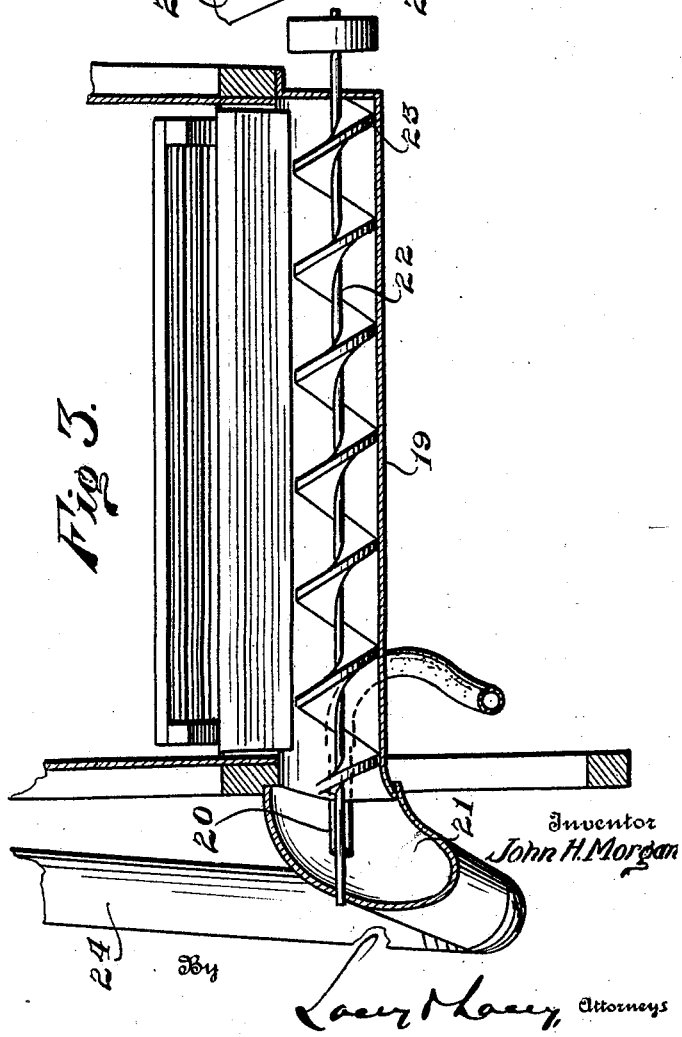
Inventor
John H. Morgan
By
Lacey & Lacey, Attorneys

UNITED STATES PATENT OFFICE.

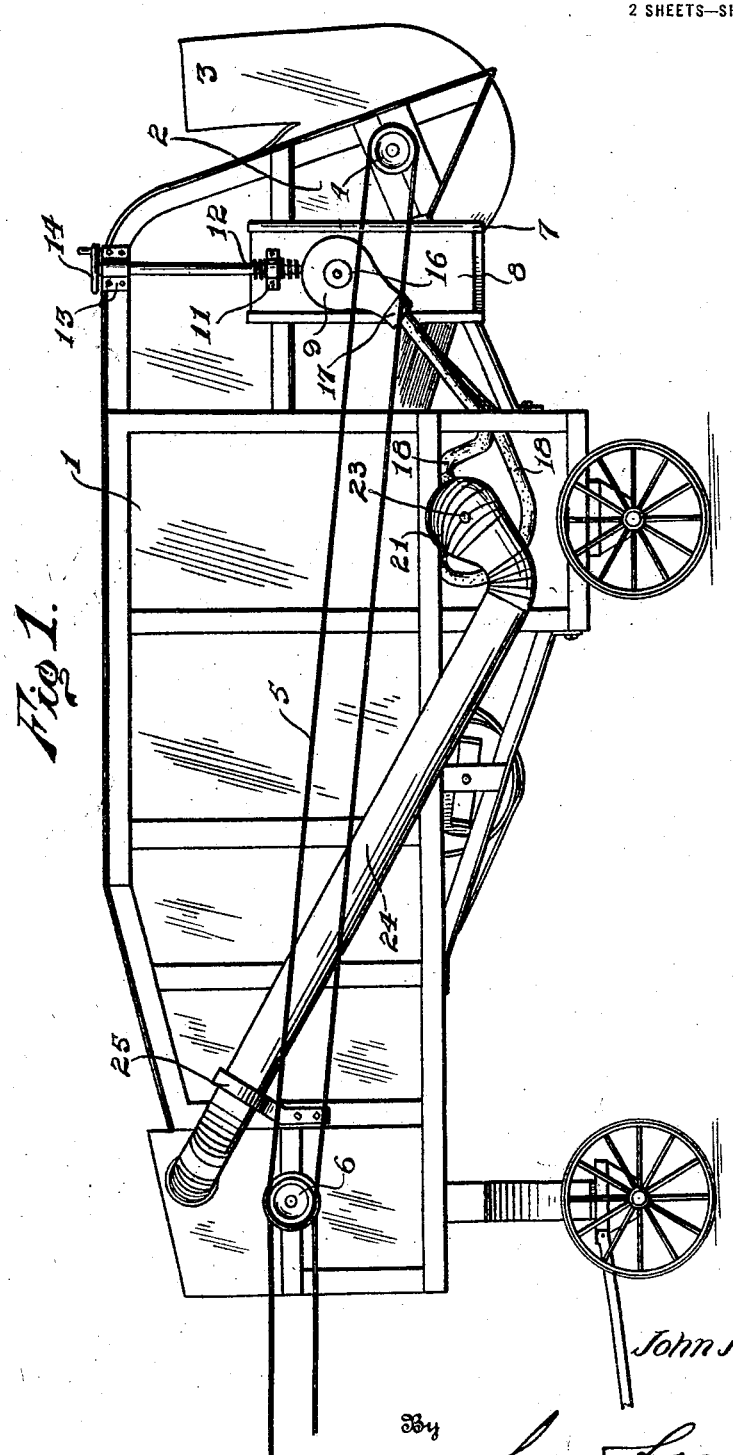

JOHN H. MORGAN, OF ELDORADO, OKLAHOMA.

BLOWER.

1,416,229. Specification of Letters Patent. Patented May 16, 1922.

Application filed September 11, 1920. Serial No. 409,618.

*To all whom it may concern:*

Be it known that I, JOHN H. MORGAN, a citizen of the United States, residing at Eldorado, in the county of Jackson and State of Oklahoma, have invented certain new and useful Improvements in Blowers, of which the following is a specification.

This invention relates to threshing machines and has for its object the provision of means whereby the grain ordinarily discharged through the tailings trough may be returned to the cylinder of the machine for further treatment. The invention also has for its object the provision of means whereby a current of air from the blower of the threshing machine will be delivered onto the grain discharged from the tailings trough at the sides of the discharge end of said trough so that it will act upon the grain in such manner as to carry it to the cylinder of the machine and prevent choking in the conveyor tube.

The invention is illustrated in the accompanying drawings and will be hereinafter fully described, the novel features being subsequently particularly pointed out in the claims.

In the drawings—

Figure 1 is a side elevation of a threshing machine having my invention applied thereto;

Fig. 2 is a plan view of one side of the machine;

Fig. 3 is a transverse section on the line 3 of Fig. 2;

Fig. 4 is a perspective view with parts broken away showing the connections between the blower casing and the tailings trough.

The threshing machine 1 may be of any preferred type and is illustrated more or less conventionally inasmuch as in itself it forms no part of my invention. At one end of the threshing machine is the usual blower casing 2, from the discharge spout 3 of which a stacker may extend. The blower is operated by a pulley 4 on the extended end of the blower shaft and a belt 5 trained around the said pulley and a pulley 6 on the cylinder shaft at the front end of the machine. In carrying out my invention, I provide a somewhat elongated opening in the side of the blower casing 2 and upon the said casing around the said opening I secure or form a guiding frame 7 which may conveniently be a plate provided with grooved flanges or cleats at its side edges. Within the grooved flanges of this guiding frame 7, I slidably fit a carrier 8 upon the outer face of which is secured a supplemental fan casing 9 having one end registering with an opening 10 in the carrier. At the upper end of the carrier 8, I provide a bracket 11 which has an internally threaded vertical opening therethrough and in the said opening I engage the lower threaded end of an adjusting shaft or rod 12 which is supported at its upper end in a suitable bearing 13 on the side of the threshing machine and is equipped with a hand wheel 14 whereby it may be manipulated, as is obvious. Within the casing 9 is mounted a supplemental fan 15 having its shaft extended through the outer side of the casing 9 and equipped with a pulley 16 which is disposed above the upper flight of the belt 5, as clearly shown in Fig. 1. When it is desired to operate the supplemental blower, the hand wheel 14 is actuated so that the adjusting rod 12 will be rotated and through its threaded engagement with the bracket 11 will cause the carrier plate 8 to descend and force the pulley 16 against the belt 5, whereupon said pulley will be set in motion and the supplemental fan 15 operated.

The casing 9 is constructed with an outlet spout 17, the discharge end of which is provided with two outlet openings in which I secure the ends of hose 18. The hose 18 extends from the spout 17 to points disposed at opposite sides of the discharge end of the tailings trough 19 where they are fitted to nipples 20 leading into an elbow 21 which may also be conveniently utilized as a bearing support for the adjacent end of the shaft 22 carrying the tailings discharge conveyor 23. The elbow 21 extends downwardly and forwardly from the tailings trough 19 and is connected directly with the lower end of a conveyor tube 24 which extends upwardly and forwardly alongside the threshing machine and has its upper forward end turned laterally to discharge upon the cylinder of the threshing machine. A bracket 25 or any other convenient support is provided at the front end of the threshing machine to support the said conveyor tube and relieve the elbow 21 of the weight of the same.

The threshing machine operates in the usual manner and the tailings or small grain delivered into the trough 19 are fed by the conveyor 23 through the open end of said trough and delivered into the elbow 21 below the nipples 20. The air blast driven from the supplemental blower 15 is divided in the spout 17 so that it passes in two streams through the hose 18 to the nipples 20 and is delivered through said nipples into the elbow 21. As shown most clearly in Fig. 3, the ends of the nipples 20 are arranged above the point of discharge of the tailings so that the air currents will not sweep into the tailings trough and choke the flow but will be delivered in the same direction with the flow of the tailings and behind the same so that they will prevent choking and will cause the grain to be carried through the tube 24 and delivered into the cylinder so that they may be again carried through the machine and all imperfect grains and all foreign matter eventually be entirely eliminated. Actual operation of my invention has shown that the air currents will carry off the tailings at a greater speed than they are delivered to the elbow so that clogging of the operation is obviated and the mechanism is of special advantage when the machine is being started after a stop inasmuch as it will permit the machine to clear itself of any grain which was left therein at the stoppage before a fresh supply is received from the feeder. The apparatus is exceedingly simple in its construction and may be readily applied to any threshing machine at a low cost. By its use, much valuable grain which is now lost will be recovered and will be thoroughly cleaned.

Having thus described the invention, what is claimed as new is:

1. The combination with a threshing machine, of a guiding frame mounted thereon, a carrier vertically movable in said frame, a blower mounted on said carrier, an elbow fitted about the discharge end of the tailings trough of the threshing machine, and means connecting the blower with the interior of the said elbow at the sides of the tailings trough.

2. The combination with a threshing machine provided at its rear end with a blower driven by a belt extending longitudinally of the side of the threshing machine, a supplemental blower mounted upon the side of the blower casing and in communication therewith, a driving pulley for said supplemental blower, means for adjusting said supplemental blower vertically whereby to bring said pulley into operative engagement with said belt, and means for delivering the blast from said supplemental blower onto the tailings discharge of the threshing machine and conveying said tailings discharge into the cylinder of the machine.

In testimony whereof I affix my signature

JOHN H. MORGAN. [L. S.]